May 11, 1965 R. M. SHERRIE 3,182,607
CONTAINER TRANSFER ARRANGEMENT
Filed Dec. 11, 1961 12 Sheets-Sheet 1
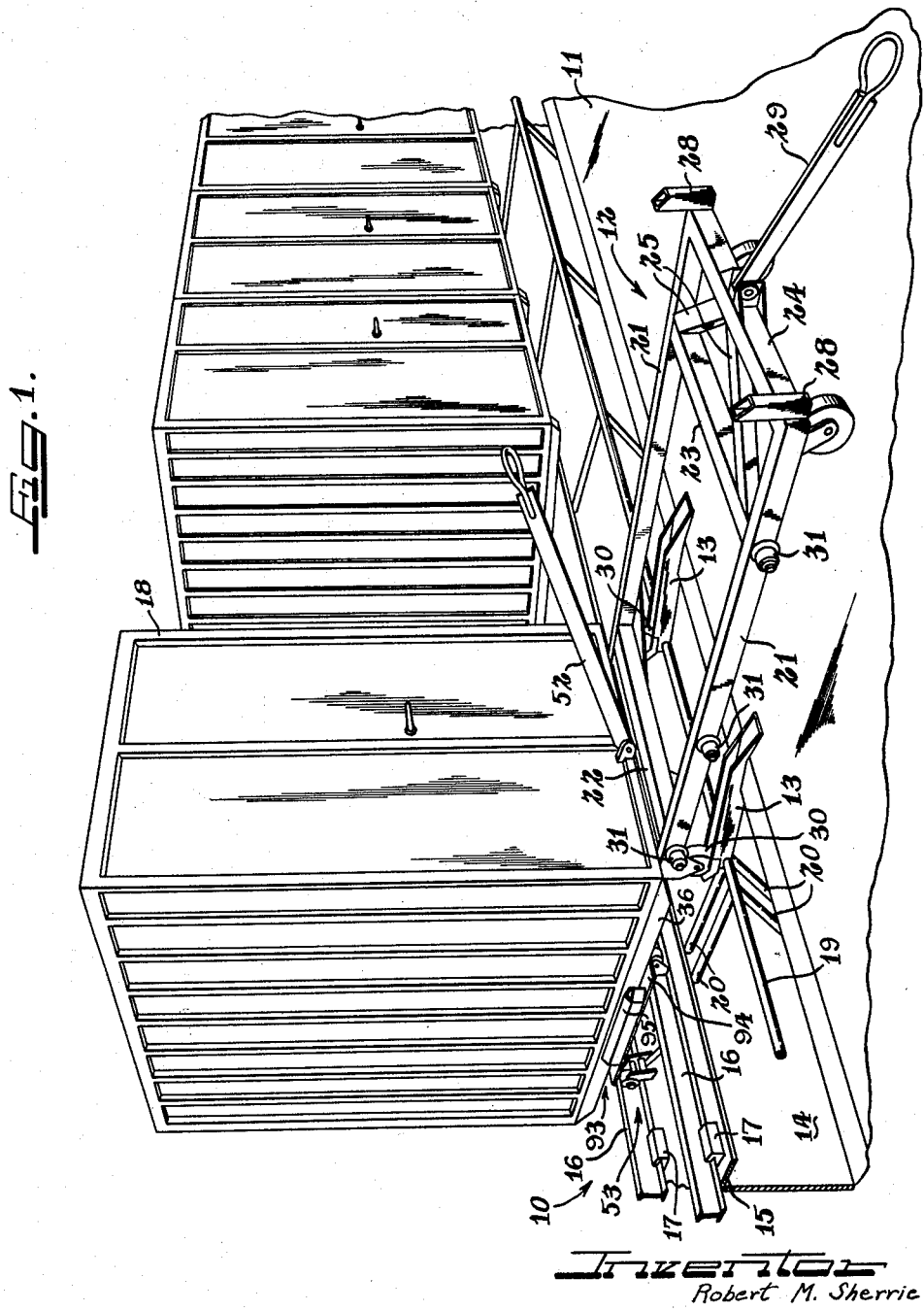
Inventor
Robert M. Sherrie
by Cromwell, Greist & Warden
Attys.

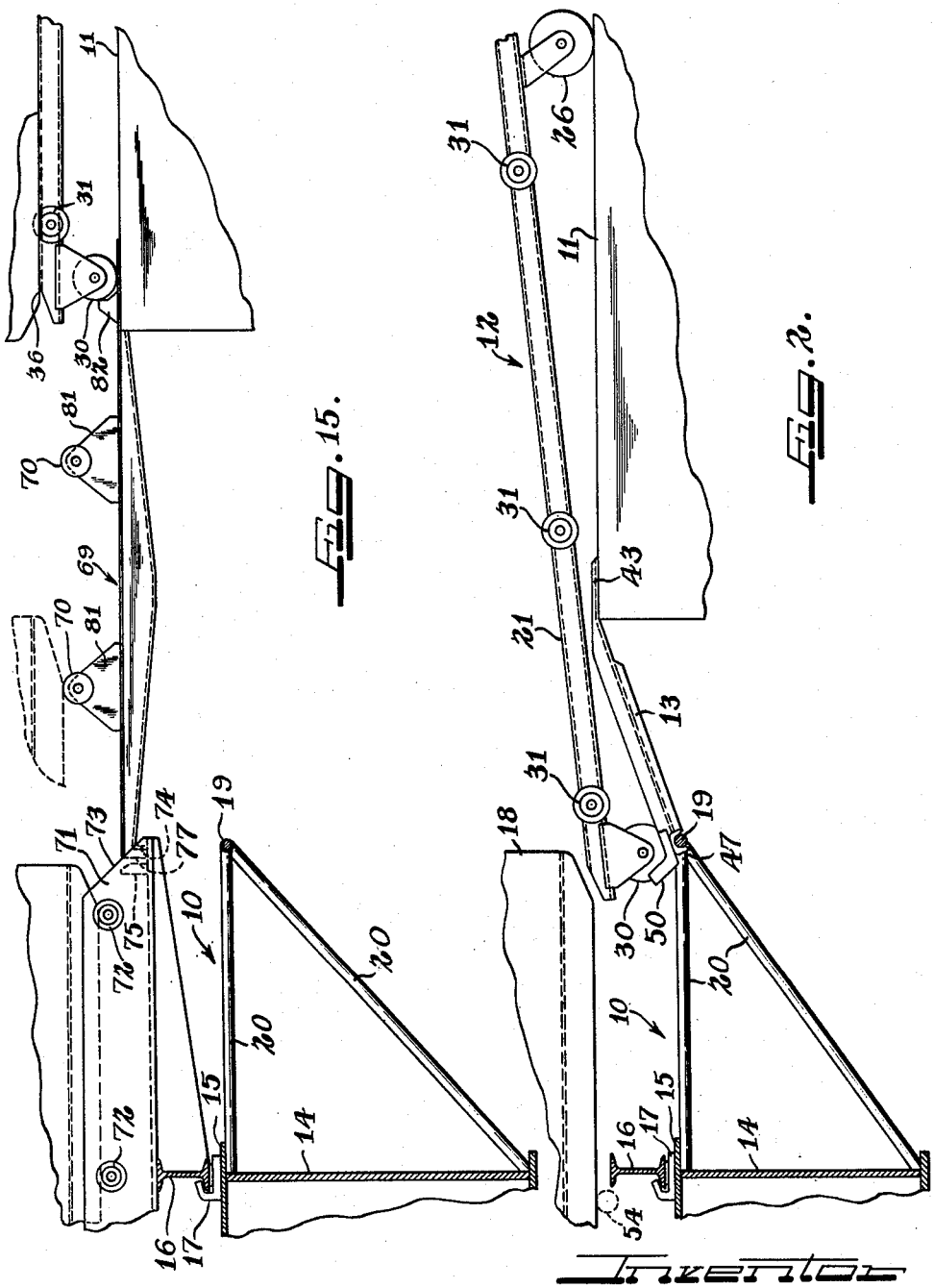

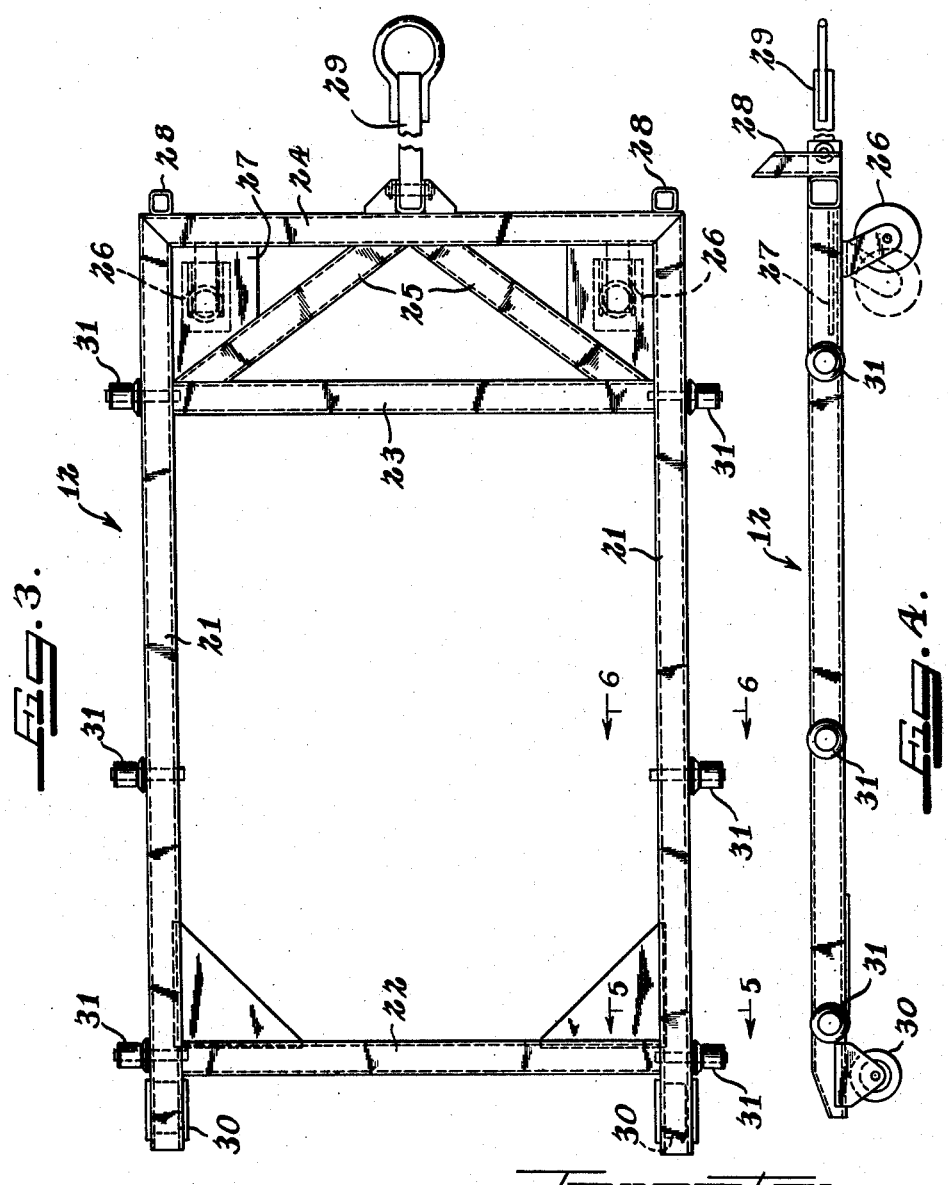

May 11, 1965  R. M. SHERRIE  3,182,607
CONTAINER TRANSFER ARRANGEMENT
Filed Dec. 11, 1961  12 Sheets-Sheet 4

Inventor
Robert M. Sherrie

By Cromwell, Greist & Warden
Attys.

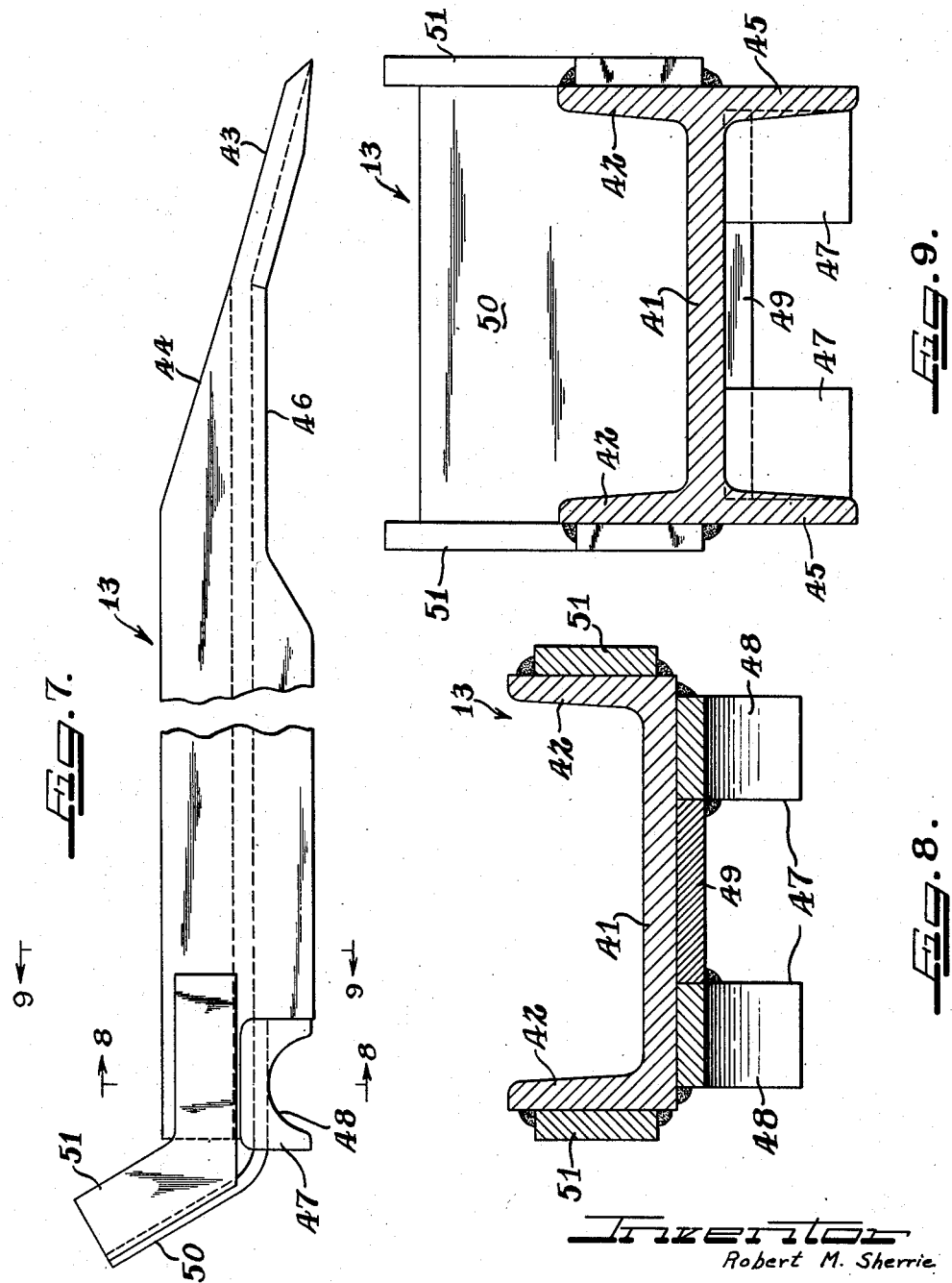

May 11, 1965 R. M. SHERRIE 3,182,607
CONTAINER TRANSFER ARRANGEMENT
Filed Dec. 11, 1961 12 Sheets-Sheet 6
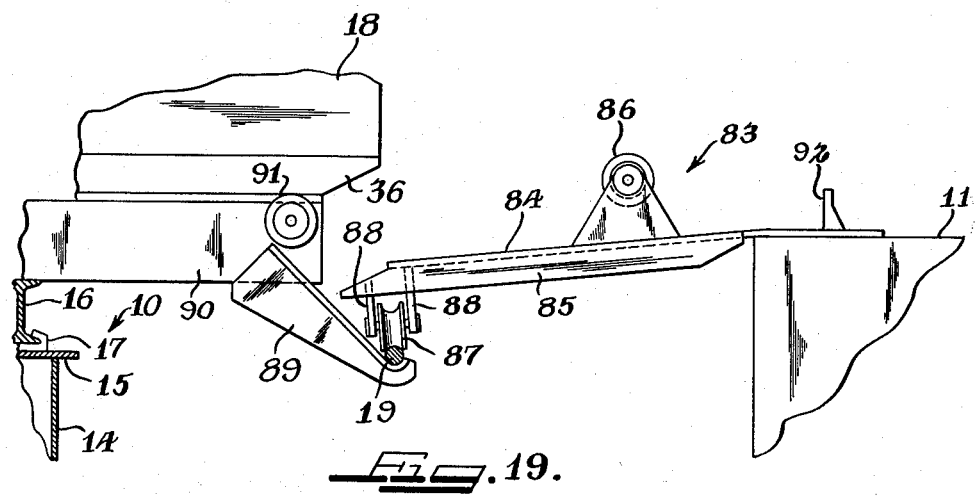
Fig. 19.
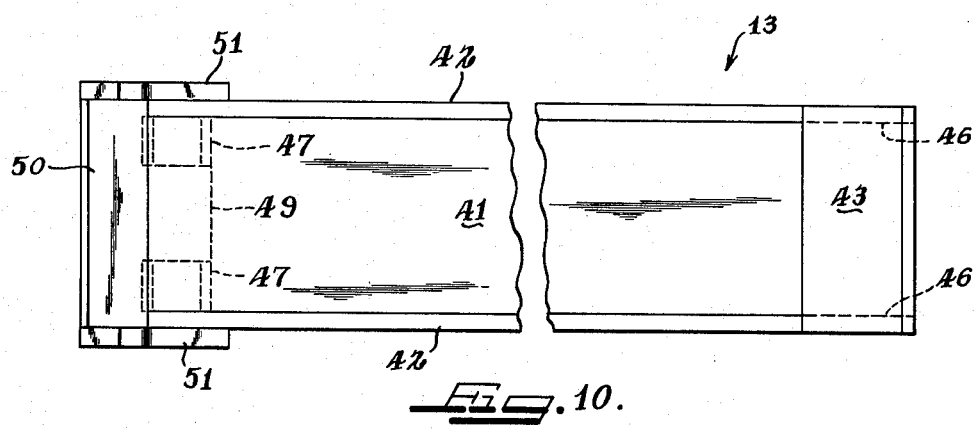
Fig. 10.
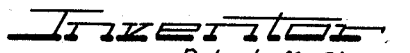
Robert M. Sherrie
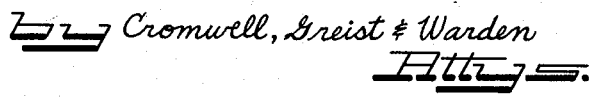
Cromwell, Greist & Warden
Attys.

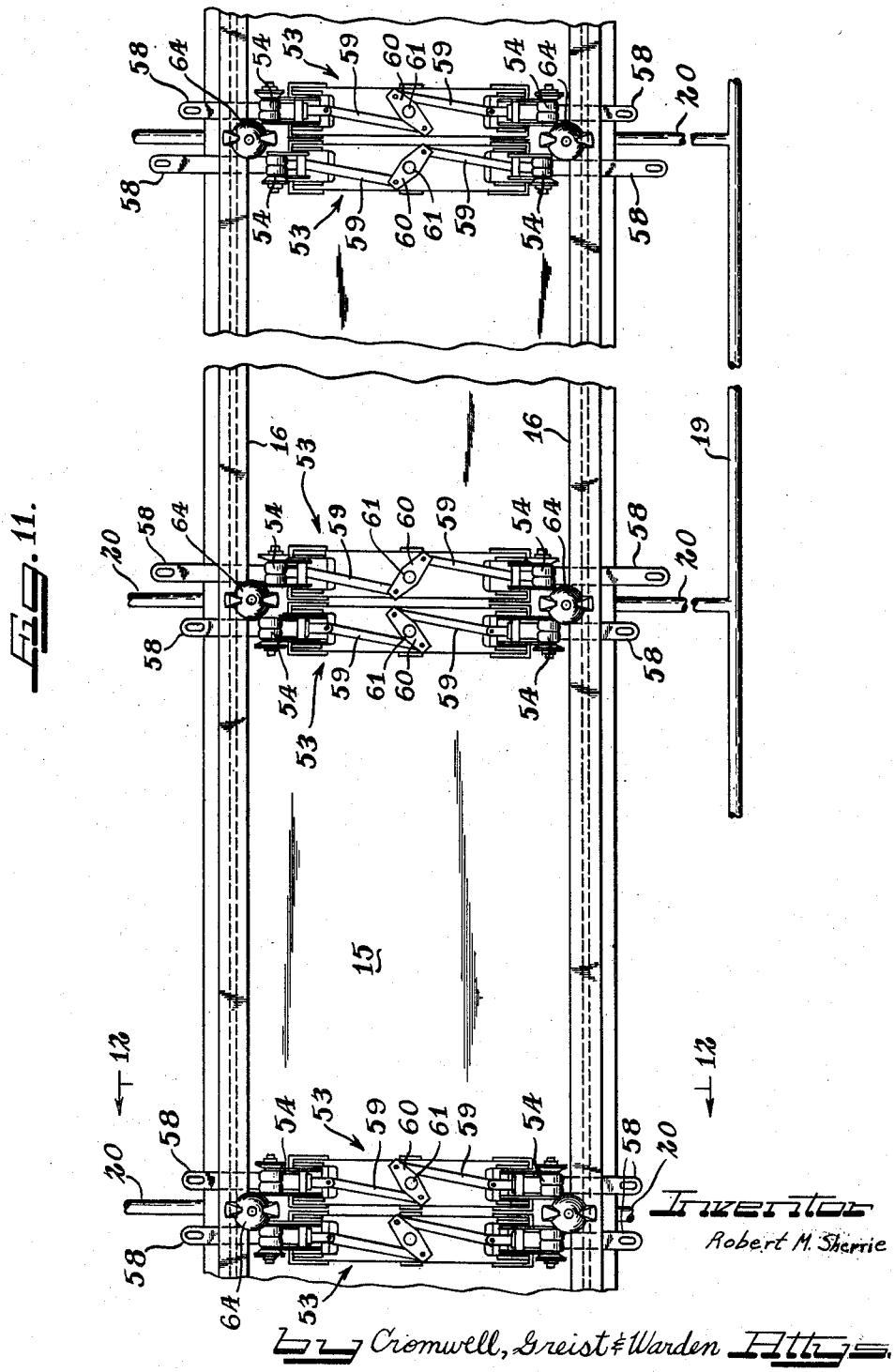

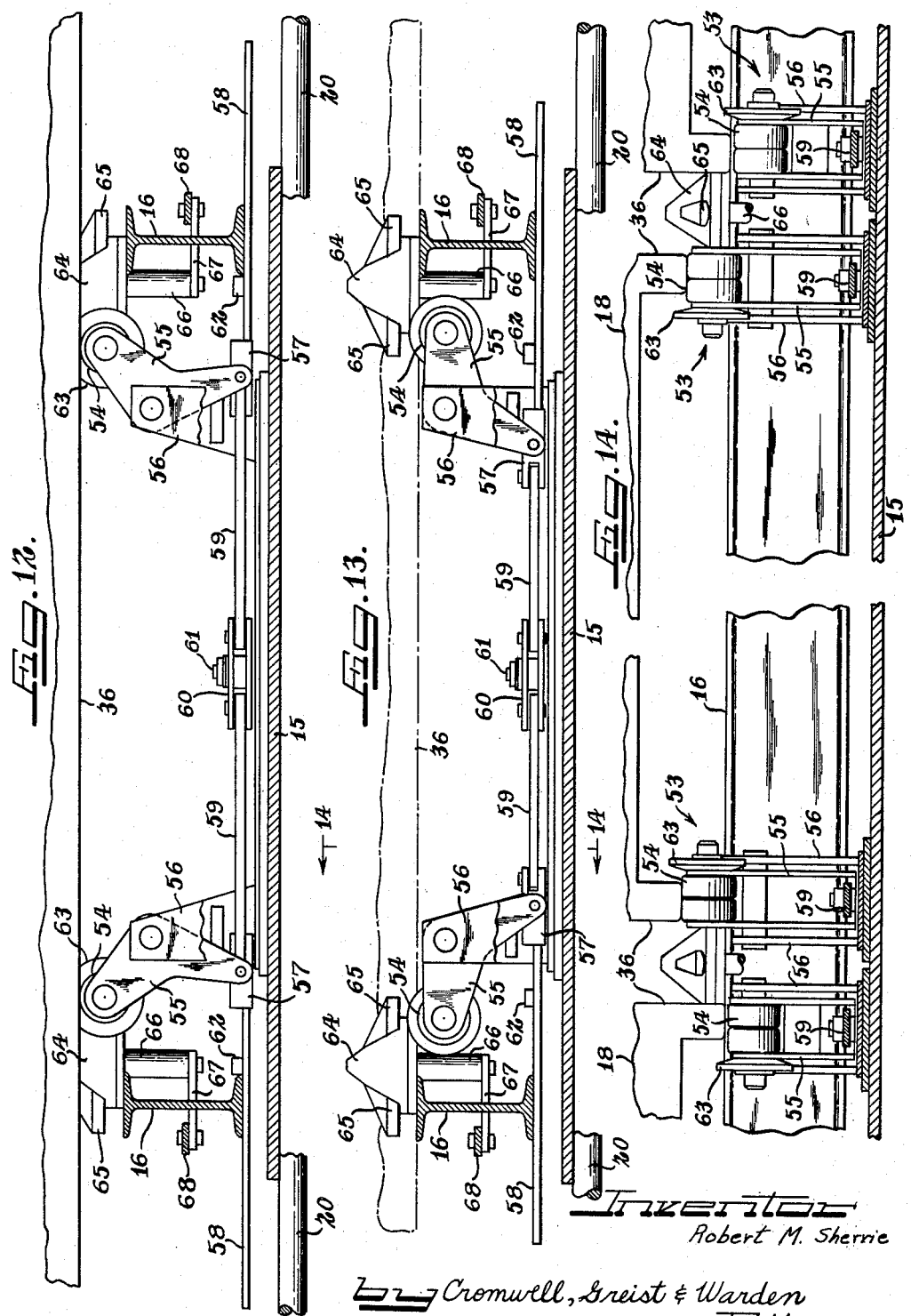

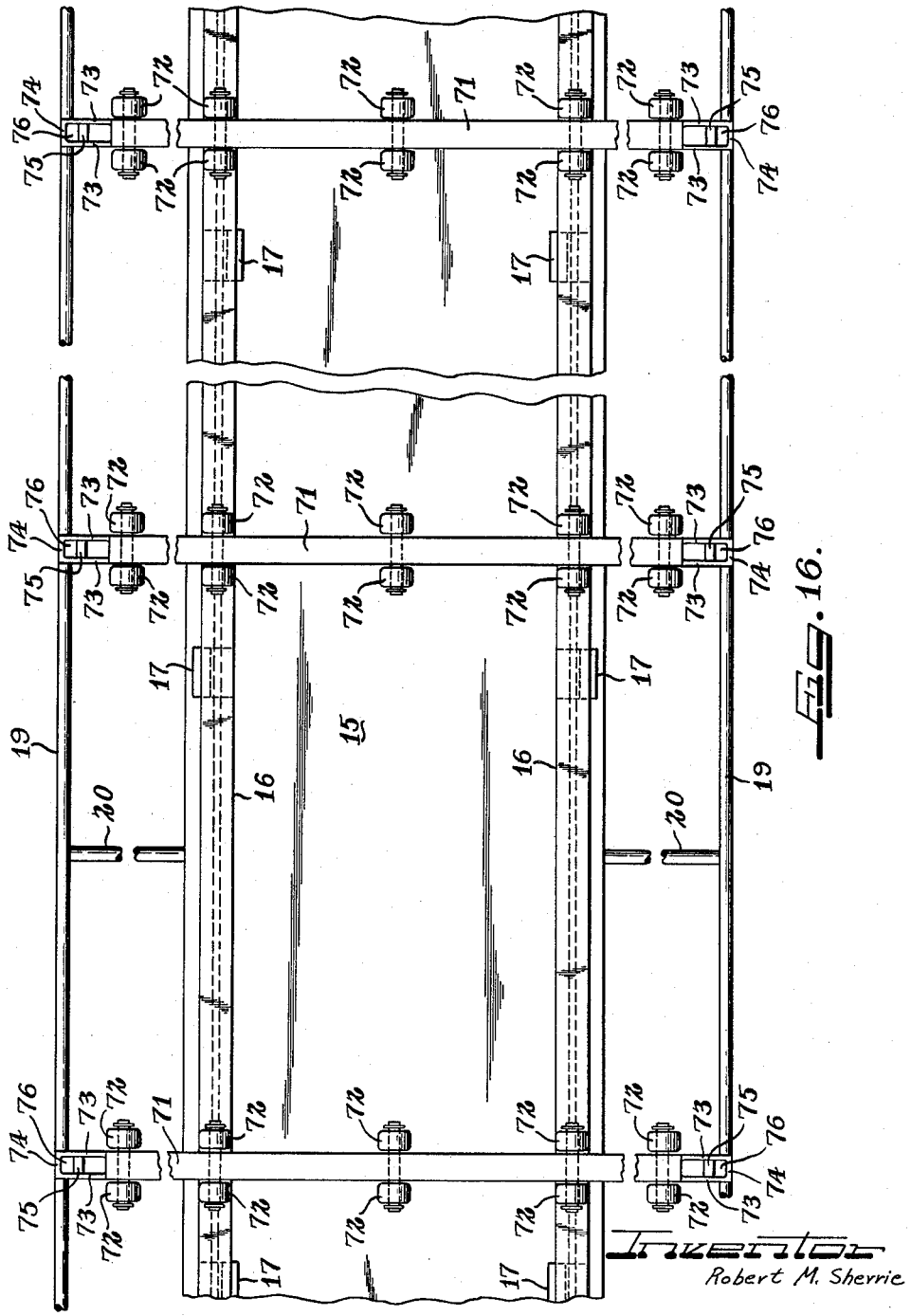

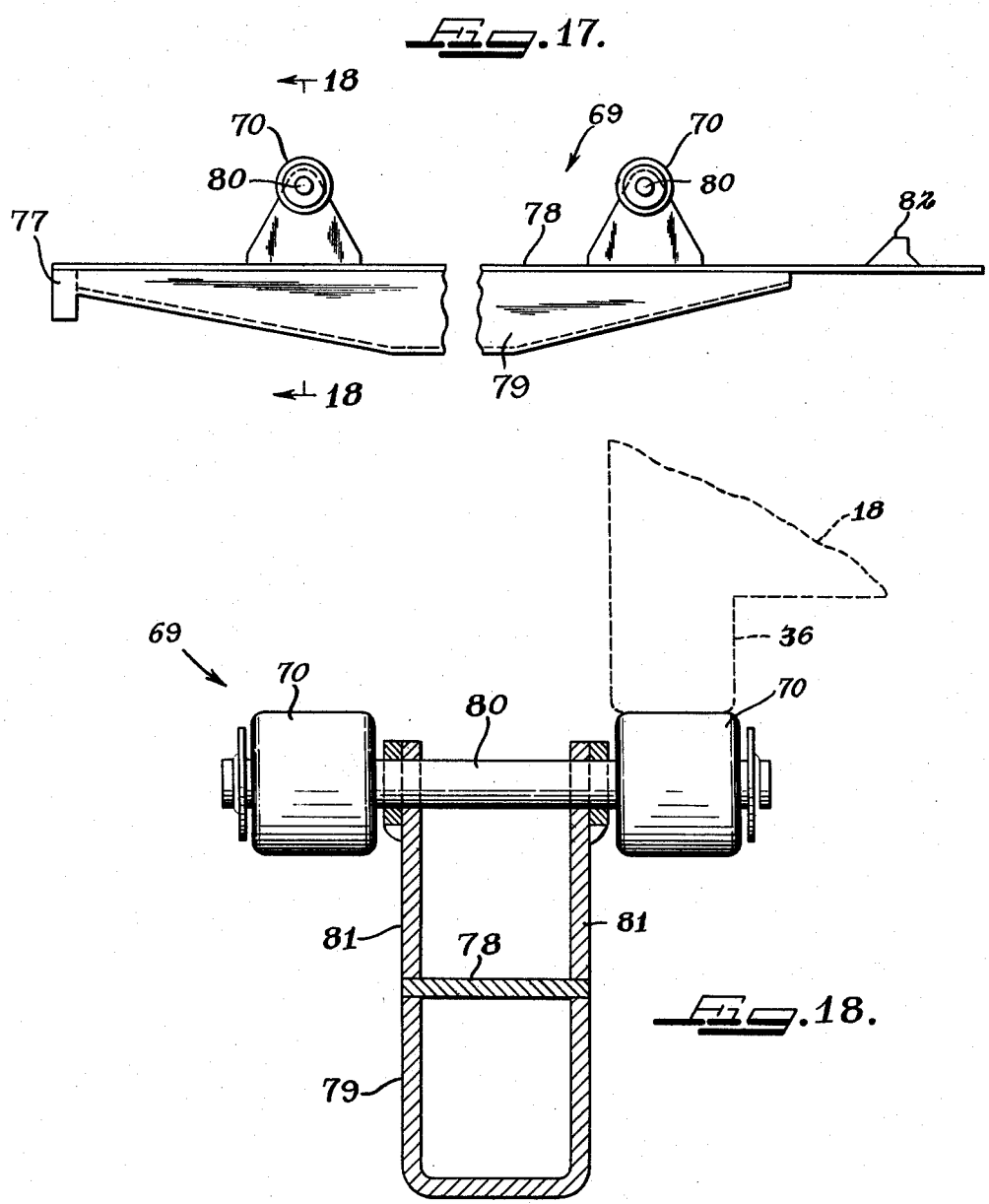

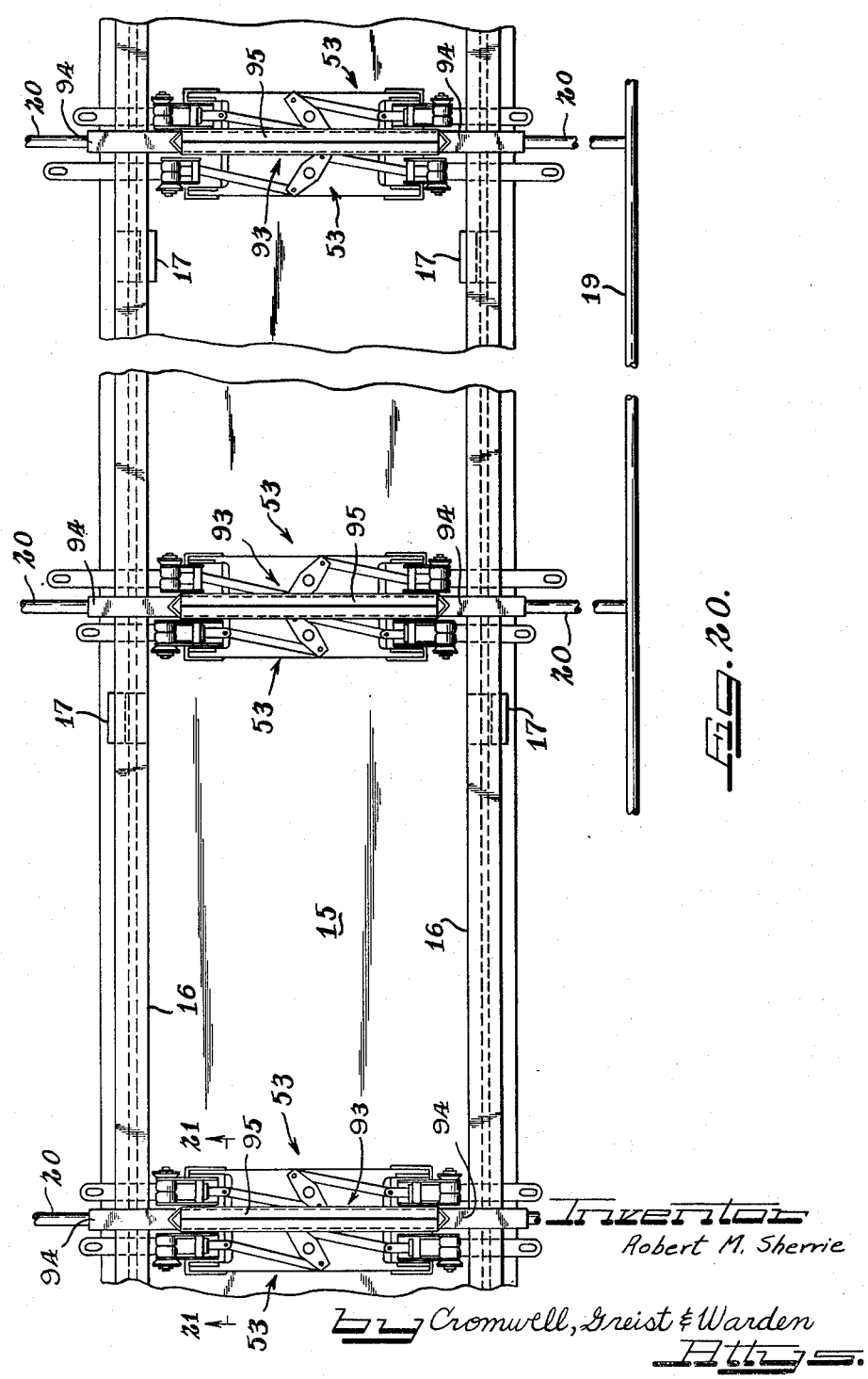

United States Patent Office 3,182,607
Patented May 11, 1965

3,182,607
CONTAINER TRANSFER ARRANGEMENT
Robert M. Sherrie, Lansing, Ill., assignor to Pullman Incorporated, Chicago, Ill., a corporation of Delaware
Filed Dec. 11, 1961, Ser. No. 158,406
8 Claims. (Cl. 105—366)

The invention relates to a new and improved container transfer arrangement particularly adapted for use with a railway car designed for container piggyback operation. More specifically, the invention deals with a highly efficient, economical and uncomplicated combination of cooperating elements providing for the transfer of articles of lading, such as containers or the like, between a railway car or other suitable vehicle and a platform surface, the combination comprising special forms of portable bridging means adapted to accommodate variations in relative height between the car and platform surface.

Container piggyback operation is becoming more widespread in the railroad industry particularly in connection with the transportation of relatively small article freight, mail and the like in high speed passenger train consists. Individual containers of a size adapted for ready handling either in the freight yard or passenger station are mounted on an open deck flat car of special design adapted for use in passenger train service. Several different types of container transfer arrangements have been proposed for use in transferring the containers to and from the railway car either at the freight or passenger depot. Containers are often of rather substantial weight and the maintaining of stability of transfer equipment, such as carts or the like, under vary degrees of load in intermediate positions of the container between the platform surface and car has created certain problems.

A principal object of the invention is to provide a new and improved container transfer system or arrangement wherein the equipment used in transferring a container provides for efficient intermediate container support between a platform surface and railway car or other suitable vehicle.

Another object is to provide a new and improved container transfer system involving the use of removable bridging plates of uncomplicated, efficiently functioning design, the bridging plates being adapted to span the distance between a platform surface and a railway car to provide intermediate container support during transfer thereof and being further particularly adapted for use with simplified container transfer and support equipment of a type adapted for use on the car as well as on the platform surface.

A further object is to provide a new and improved container transfer arrangement comprising, basically, the combination of container transfer cart means for platform surface use, uniquely cooperating bridging plates for use in spanning the distance between the platform surface and railway car, and different forms of cooperating container transfer and support means mounted on the railway car.

Other objects not specifically set forth will become apparent from the following detailed description of the invention made in conjunction with the accompanying drawings wherein:

FIG. 1 is a fragmentary perspective of one form of container transfer arrangement of the invention;

FIG. 2 is a fragmentary side elevation of the arrangement of FIG. 1;

FIG. 3 is a plan view of the cart means used in the arrangements of the present invention;

FIG. 4 is a side elevation of the cart means of FIG. 3;

FIG. 7 is a fragmentary side elevation of the form of bridging plate used in the arrangement of FIG. 1;

FIG. 8 is an enlarged section of a portion of the bridging plate taken generally along line 8—8 in FIG. 7;

FIG. 9 is an enlarged section of another portion of the plate taken generally along line 9—9 in FIG. 7;

FIG. 10 is a fragmentary top plan view of the plate of FIG. 7;

FIG. 11 is a fragmentary top plan view of a portion of the railway car forming a part of the container transfer arrangement of the invention, this view illustrating container transfer and support means mounted on the car;

FIG. 12 is an enlarged transverse section viewed generally along line 12—12 in FIG. 11;

FIG. 13 is a view similar to FIG. 12 illustrating operation of the elements shown therein;

FIG. 14 is a sectional view taken generally along line 14—14 in FIG. 13;

FIG. 15 is a fragmentary side elevation of still another form of container transfer arrangement;

FIG. 16 is a fragmentary plan view of a modified form of container transfer and support means carried by a railway car and adapted for use in the arrangement of FIG. 15;

FIG. 17 is a fragmentary side elevation of the bridging plate of the arrangement of FIG. 15;

FIG. 18 is an enlarged section of the bridging plate taken generally along line 18—18 in FIG. 17;

FIG. 19 is a fragmentary side elevation of still another modified form of bridging plate adapted for use with the container transfer arrangements of the invention;

FIG. 20 is a fragmentary plan view of container transfer and support means adapted for use on a railway car as generally shown in FIG. 1.

Figure 5:
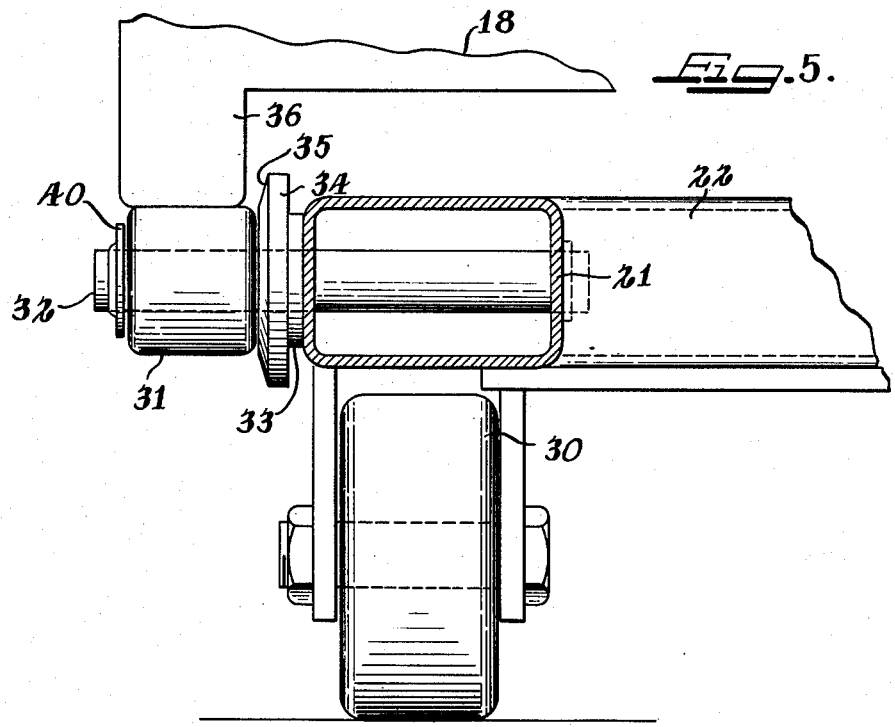
FIG. 5 is an enlarged fragmentary section of a portion of the cart means taken generally along line 5—5 in FIG. 3.

The basic concept of the container transfer system or arrangement of the present invention involves a use of portable bridging plates adapted for ready attachment at one end to a part of a railway car and for supported engagement at the other end thereof with a platform surface or the like, the bridging plates being of uncomplicated design to permit ready modification to accommodate rather substantial variations in height between the loading surface of a car and a platform surface, the bridging plates further being especially adapted for cooperative use with simplified cart means whereby a container is transferred between a car and platform or cart means in a highly efficient manner. FIG. 1 illustrates one form of container transfer system involving an open deck railway car 10 of any suitable flat car design, a platform surface 11 spaced to one side of the car 10, a wheel supported cart means 12, and a pair of bridging plates 13. The car 10 is not shown in detail but is of known type generally referred to as a skeleton car comprising essentially a longitudinal center sill 14 constituting the main structural member of the car, the center sill being suitably supported by wheel trucks (not shown) and including standard couplers (not shown) at opposite ends thereof.

The top cover plate 15 of the center sill 14 has mounted thereon a cushion rack assembly generally including a pair of longitudinally extending, transversely spaced rail members 16 which are attached to the center sill by support brackets 17 and a cushioning device (not shown) to permit longitudinal relative movement between the rack assembly and car 10. This type of rack assembly is well known and is used to support a plurality of longitudinally aligned containers 18 on the car 10 and protect the containers and contents thereof from damage as a result of forces developed in buff and draft operation of the car. As is conventional in skeleton cars such as the car 10 shown in FIG. 1, outrigger safety rails are attached to opposite sides of the center sill 14 and extend longitudinally of the car outwardly of the wheel trucks and end sill structures thereof. Such safety rails include the longitudinal bar-like member or rod 19 attached by stabilizing rods 20 to the center sill 14.

FIGS. 1 and 2 generally illustrate operational use of the basic elements described above. The bridging plates 13 span the horizontal and vertical distance between the platform 11 and car 10 by being placed in supported engagement at one end thereof with the adjacent safety bar 19 and at the other end thereof in supported engagement on the platform surface 11. The cart 12 is introduced onto the bridging plates 13 and thereby placed in close association with the rail members 16 of the rack assembly mounted on the car 10. The cart 12 and car 10 both include suitable container transfer and support roller means, of a type to be described, providing for ready transfer of the container 18 to and from the platform 11. The specific structural features of the cart 12 are shown in FIGS. 3–6. This cart is basically formed from a pair of longitudinal side frame members 21 interconnected by transverse frame members 22, 23 and 24 as well as diagonal bracing frame members 25. The main frame defined by the frame members described is supported at one end by caster wheel assemblies 26 between the transverse frame members 23 and 24, the assemblies 26 being suitably mounted below horizontal plates 27. The transverse frame member 24 includes upstanding stop members 28 adjacent the longitudinal frame members 21 to control the extent to which a container is moved onto the cart. A pivotally attached drawbar 29 is carried centrally of the transverse frame member 24 and is of known type for attachment to a tractor or the like for operation of the cart on the platform 11. The opposite ends of the longitudinal frame members 21 have mounted thereon wheel units 30 which are adapted to be introduced onto the bridging plates 13 as shown in FIGS. 1 and 2.

Figure 6:
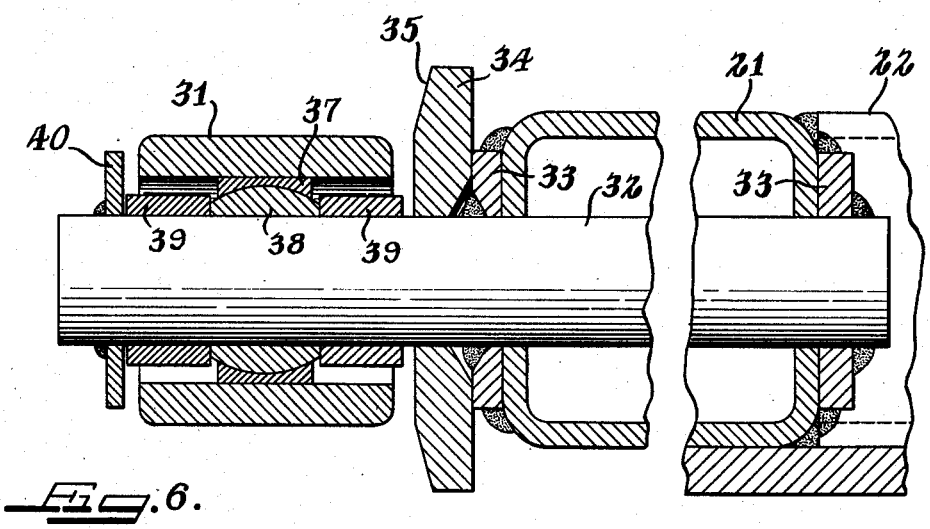
FIG. 6 is an enlarged fragmentary section of still another portion of the cart means taken generally along line 6—6 in FIG. 3.

Each longitudinal frame member 21 has attached thereto a plurality of spaced rollers 31 located outboard thereof. As best shown in FIG. 6, each roller assembly includes a fixed shaft 32 extending through the hollow frame member 21 and fixed thereto by reinforcing plates 33. Outwardly of the outermost plate 33 a radially flanged container guide member 34 is mounted on the shaft 32. This guide member is provided with an outer beveled side face portion 35 adapted to be engaged by a depending bottom rim 36 (FIG. 5) of a container 18, each container including a pair of such rims extending along the bottom edges of opposite sides thereof. The roller 31 is of cylindrical design and includes along the inner surface thereof a fixed annular bearing race 37 engaged with a convex bearing ring 38 fixed to the shaft 32 between thrust watchers 39. A suitable lock washer 40 is mounted outwardly of the roller 31 on the shaft 32.

FIGS. 7–10 illustrate the structural details of a bridging plate 13. This plate includes an upwardly opening channel member having a bottom wall portion 41 terminating in upstanding side walls or flange portions 42. The platform end of the plate is formed with a downwardly inclined bottom wall section 43 and the side walls 42 terminate in inclined end surface portions 44 at an angle coextensive with the top surface of the bottom wall section 43. The plate 13 centrally thereof includes a pair of spaced depending flange portions 45 joined with the bottom wall 41 and lying in the same plane as the upstanding side walls 42. The depending wall portions 45 are recessed inwardly at 46 adjacent the inclined section 43 at the platform end of the plate. The car end of the plate includes a pair of mounted brackets 47 each formed with a semi-cylindrical recess 48 adapted to receive therein the upper surface portion of the safety bar 19 of the car 10 previously described. The brackets 47 constitute attachment stop means for the plate 13 which when in engagement with the safety bar 19 of the car 10 fixes the positioning of the plate 13 relative to the car 10. The brackets 47 have received therebetween an end plate 49 which extends beyond the car end of the plate 13 and includes an upwardly inclined portion 50 defining a stop means for the wheels 30 of the cart 12 as shown in FIG. 2. The inclined portion 50 is formed with side plates 51 which are of the same general configuration and which inwardly overextend the side walls 42 of the plate 13.

As shown in FIGS. 1 and 2, each plate 13 spans the distance between the edge of the platform 11 and the safety bar 19 of the car 10. The recessed depending wall portions 46 adjacent the platform end of each plate 13 are designed to conform to the right angled edge of the platform 11. The downwardly inclined bottom wall section 43 of the plate is adapted to be received in flat relation on the platform surface to readily accept the front wheels 30 of the cart 12 between the upstanding side walls 42. The cart is advanced along the plates 13 and the extent to which the end of the cart moves toward the car 10 is controlled by abutment of the wheels 30 with the upwardly angled wall portions 50 and 51. In this manner a positive stop means is provided to prevent overextension of the cart 12 from the platform 11. The plates 13 are of sufficient length to accommodate specified spacing between a given platform 11 and car 10 and the angle of inclination provided by the plates 30 may be varied to fit a given situation. With this arrangement the cart 12 is placed in sufficiently close association with the rack assembly and rail members 16 mounted on the center sill 14 of the car 10 to permit container transfer from the rollers 31 of the cart 12 onto suitable container transfer and support means carried on the car 10 and of a manner to be described. To aid in movement of a container 18 during transfer thereof, the container may be provided with a pivotally connected drawbar 52 as shown in FIG. 1. Any other suitable means for moving the container 18 between the car 10 and cart 12 may be used.

FIGS. 11–14 illustrate one form of container transfer and support means adapted for use with the various transfer arrangements or systems of the invention. Mounted on the top cover plate 15 of the center sill 14 of the car 10 are a plurality of vertically operable roller assemblies 53 arranged in longitudinally spaced paired relation and extending between the rail members 16 of the rack assembly. Each roller assembly comprises a pair of transversely spaced roller units including rollers 54 rotatably mounted between rocker arm type plates 55 which are centrally pivotally attached to a pair of upstanding flanges 56 fixedly mounted on the top plate 15. The lowermost ends of the plates 55 are pivotally attached to an operating block 57 which in turn has attached thereto an outwardly directed operating arm 58 extending beneath an adjacent rail member 16. As is well known, the rail members 16 are raised from the top plate 15 of the center sill by the support brackets 17 previously described to permit longitudinal relative movement between the rack assembly and the car. This arrangement thus provides a space between each rail member 16 and the plate 15 through which the operating arms 58 may extend. The block 57 is further pivotally attached to an operating lever 59 which extends to the central portion of the area between the rail members 16 and which in turn is pivotally attached to an outer end of a rocker arm unit 60 which operates in a horizontal plane about a pivot pin 61 suitably attached to the plate 15. The opposite end of the rocker unit 60 is in turn pivotally attached to a similar operating lever 59 extending to a corresponding roller assembly which also is provided with an outwardly directed operating arm 58 extending beneath the rail member 16 adjacent thereto. Each of the operating arms 58 as shown in FIG.

11 extends outwardly beyond the adjacent rail member 16 and is available for attachment to a chain or the like for pull operation to raise the roller units attached thereto. The weight of each unit is sufficient to return the same to a lowered inoperative position. Thus the roller units may be operated from either side of the car 10.

FIG. 12 illustrates the roller units in their raised operative positions between the rail members 16, the extent to which the roller units are raised being limited by fixed stop means 62 carried on the top surfaces of the operating arms 58 for abutment with the adjacent rail members 16. In the raised positions of the roller units 54, the depending side rims 36 of a container 18 may be received thereon for transfer to and from the car 10. The direction of movement of a container 18 transversely across the car 10 is controlled by guide flanges 63 forming a part of the roller units 54. When a container being transferred onto the car 10 is in final position, the roller assemblies 54 are permitted to retract into the positions illustrated in FIG. 13 and the container is lowered into resting engagement with the top surfaces of the rail members 16.

Any suitable means may be used to lock the containers onto the car 10. One such suitable means is illustrated in FIGS. 11-14 as being in the form of a pivotal cone 64 provided with a pair of oppositely projecting locking flanges 65 which are adapted to be received in suitable locking recesses (not shown) of adjacent containers in resting engagement on the rail members 16. The locking cones 64 and means for operating the same are well known and do not constitute a part of this invention. Each cone 64 is mounted between adjacent roller assemblies 53 as best shown in FIG. 11 just inwardly of the rail members 16. The cones as shown in FIG. 11 are in their unlocked position. Each cone 64 is rotatably mounted in a spindle portion 66 and is attached to an operating arm 67 extending through a suitable slot in the adjacent rail member 16 into pivotal attachment with an operating lever 68 extending longitudinally of the rail member 16 along the outer surface thereof. In this manner a plurality of cones 64 are interconnected for simultaneous operation by a single operating lever 68, such operation occurring when the lever 68 is moved relative to the adjacent rail member 16 longitudinally thereof.

FIG. 15 illustrates a modified form of container transfer system. In describing the elements of this system, similar reference numerals will be used to identify elements and components which are identical to those described above. A pair of modified bridging plates 69 are used to span the distance between the platform 11 and the car 10. This modified form of bridging plate basically makes use of upstanding rollers 70 on which the depending side rims 36 of the container 18 are received during transfer of the container between the platform and car. The rack assembly including the rail members 16 thereof have mounted thereon a plurality of longitudinally spaced, transverse container support means 71 provided with a plurality of longitudinally spaced, oppositely paired rollers 72 on which the depending side rims 36 of the container 18 are received when the container is positioned on the car 10.

FIG. 16 generally illustrates the type of transverse support means 71 used. Each support means is in the form of a hollow beam of generally rectangular cross section having mounted in the side walls thereof the oppositely directed pairs of rollers 72. Each beam 71 is fixedly secured to the top surfaces of the rail members 16 and projects laterally therefrom into overlying relation with the safety rail structure on each side of the car 10. Each end of a transverse beam 71 is open and formed with a slanted side wall surface portion 73 closed off at the bottom thereof by a vertical end wall section 74 of low height. Spaced inwardly of the vertical wall section 74 is a transverse vertical plate 75 which extends between the upwardly angled side walls 73. The vertical walls 74 and 75 define therebetween a recess 76 adapted to receive therein a depending block-like stop means 77 formed at the car end of a bridging plate 69.

FIGS. 17 and 18 illustrate the bridging plate 69 as being formed with a flat top plate portion 78 fixed to a depending reinforcing web structure 79 of generally U-shape. The web structure 79 may be of any suitable configuration, such as of increasing depth toward the center thereof as shown in FIGS. 15 and 17. The top plate 78 is provided with one or more upstanding roller assemblies including the rollers 70 which, as shown in FIG. 18, are in transversely paired relation with each roller being mounted on a pin 80 extending through a pair of apertured upstanding flanges 81 fixedly mounted on the top plate 78. The previously described depending abutment means 77 is fixed to the car end of the top plate 78 and is reinforced by the web structure 79 in attachment therewith. The platform end of the bridging plate 69 comprises a flat extension of the top plate 78 adapted to be received against the top surface of the platform 11 and further includes an upwardly projecting stop block 82 adapted to receive a wheel 30 of a cart 12 thereagainst to limit the extent to which the cart is introduced onto the bridging plate 69.

Similar with the use of the bridging plates 13 described above, the plates 69 are used in pairs for operative engagement with a pair of adjacent transverse beams 71. The plates 69 are engaged with adjacent ends of the beams 71 with the stop blocks 77 being positioned between the vertical wall sections 74 and 75 as shown in FIG. 15. The flat opposite end extension of the top plate 78 of each bridging plate 69 is received in flush engagement with the platform 11 and the front wheel supported end of the cart 12 is introduced thereonto with a front wheel 30 of the cart being placed in abutment with the stop block 82. A container 18 carried by the cart 12 with the side depending rims 36 thereof supported by the outboard rollers 31 is introduced onto the paired bridging plates 69 with the depending rims 36 engaging the inner series of rollers 70 of each bridging plate 69 in the manner as shown in FIG. 18. The container is transferred onto the car with the depending rims 36 thereof being placed in resting engagement with the aligned rollers 72 of the cooperating transverse beams 71. Any suitable locking means may then be used to lock the container 18 on the car 10. If desired, the vertically operating type of roller assembly 53 previously described may be used with the transverse beam structures 71, it being understood that a container 18 is actually received between adjacent transverse beams 71 and, where a vertically adjustable roller assembly is used, may be lowered into resting engagement with the top surfaces of the rail members 16.

FIG. 19 illustrates still another form of bridging plate 83 making use of the principles of the present invention. This plate includes a flat top plate portion 84 having depending therefrom a reinforcing flange structure 85 and having mounted thereon projecting upwardly therefrom a roller assembly 86 similar to the assembly 70 described above. The car end of the plate 83 is formed with at least one depending, transversely operating roller 87 of pulley-like configuration rotatably mounted between depending flanges 88. The roller 87 engages the safety bar 19 of the car 10, this bar being supported by a plurality of longitudinally spaced, outwardly inclined hangers 89 fixedly attached to transverse container support beams 90. The beams 90 may be of any suitable configuration such as similar to the beams 71 previously described and fixed transversely of the rail members 16 of the rack assembly of the car 10. The beams 90 may include pairs of side rollers 91 on which the depending rims 36 of a container are received on the car. The platform end of the bridging plate 83 is formed with a projecting flat plate section overlying the top surface of the platform and including thereon an upstanding stop block 92 to limit the extent to which the cart 12 may be introduced onto the plate 83.

The arrangement described in FIG. 19 operates in the same manner as the arrangement of FIG. 15. By reason of the provision of the projecting flat plate section on the platform end of the bridging plates 69 and 83, these plates may be readily fabricated to accommodate any reasonable vertical distance between the platform 11 and car 10. Referring specifically to the bridging plate 83, the special mounting thereof on the car 10 permits ready movement thereof longitudinally of the car during successive container transfer relative to the car without necessitating complete separation of the bridging plate from the car. In other words, the platform end of each bridging plate 83 need merely be raised slightly and the plate then rolled on the roller 87 along the safety rod 19 to any desired location for container transfer purposes. Furthermore, the particular mounting arrangement of the safety bar 19 by use of the longitudinally spaced hangers 89 illustrates a further use for the transverse container support means, such as the beam 90, in the fabrication of the car 10. This particular mounting arrangement not only provides a longitudinally continuous support surface for the car end of the bridging plates 83, but also provides the car with the required safety side bar structure.

Figure 21:
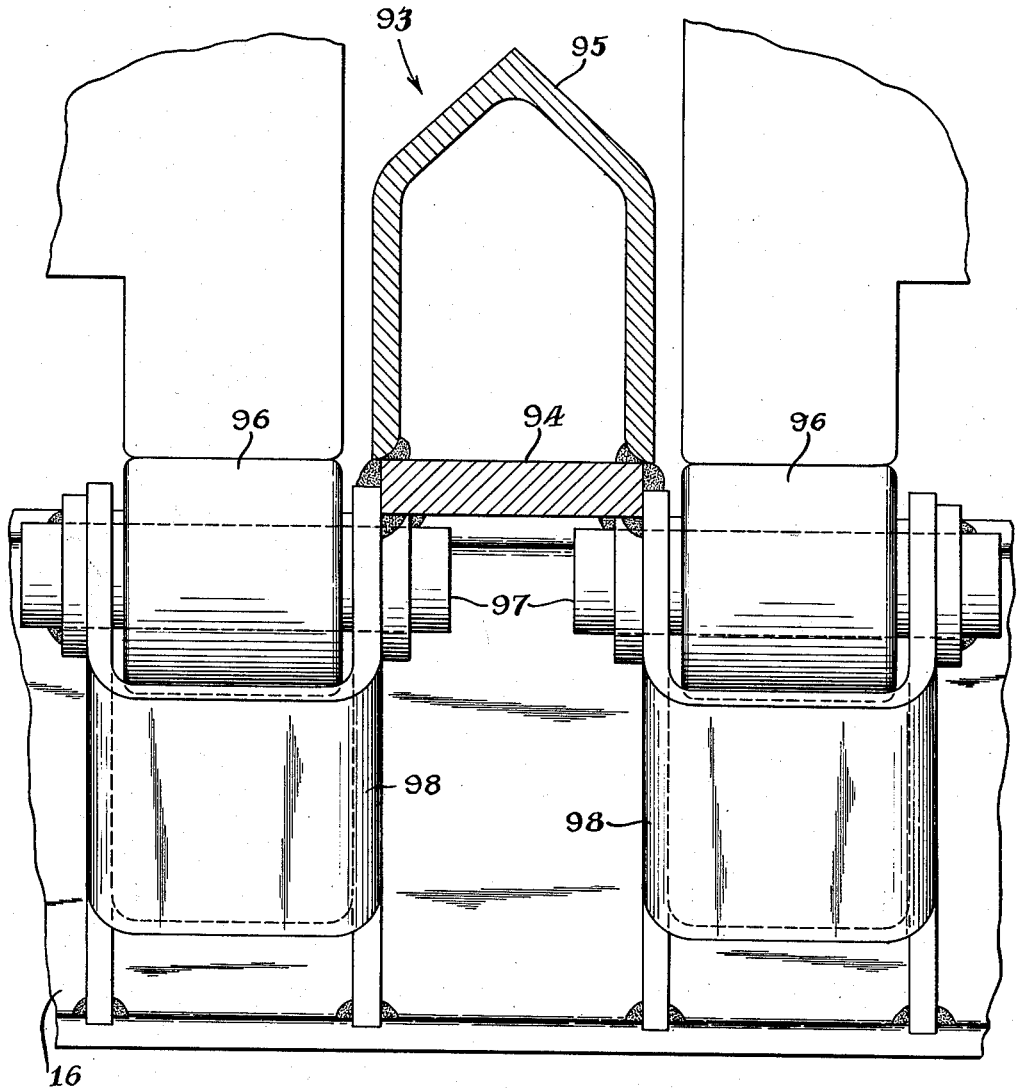
FIG. 21 is an enlarged transverse section of a modification of the support means of FIG. 20 as viewed generally along line 21—21 therein.

FIGS. 1, 20 and 21 illustrate a special form of container guide means which may be used with the modified systems of the invention. FIGS. 1 and 20 illustrate a guide member 93 including flat plate end portions 94 suitably attached to the spaced rail members 16 and including a centrally located inverted V-shaped top surface portion 95. Positioned to each side of the guide member 93 is a vertically operable roller assembly 53 of a type previously described. These roller assemblies are operable into a vertical position to receive the depending rims 36 of a container 18 thereon. During transfer of a container relative to the car 10, the container might possibly become misaligned relative to the roller assemblies 53 and, during shifting from the rollers of the cart 12 or one form of bridging plate, may contact one of the sloped top surface portions of the guide member 93 and by reason of this contact be guided downwardly into proper engagement with the adjacent raised roller assembly 53. Thus the member 93 functions to provide for proper guided alignment of containers relative to the supporting roller assemblies during transfer thereof.

FIG. 21 illustrates the guide member 93 in section and in combination with fixed roller assemblies adapted to receive and support the containers thereon. The roller assemblies include rollers 96 mounted on pins 97 in fixed roller housing 98 attached to each rail member 16 on opposite sides of the guide member 93. The roller assemblies may also be duplicated on opposite sides of each rail member 16 to provide greater vertical support for a container. Here again, during transfer of a container relative to the car 10, any lateral shifting thereof which might cause undesirable misalignment is corrected by the guide surfaces 95 with the result that the container is properly mounted on the rollers 96 and centered between the adjacent guide members 95 on the car. FIGS. 20 and 21 are illustrative of different types of roller assemblies adapted for use with the guide member 93. It will be understood that the rollers 72 of FIG. 16 may also be used with the guide member 93 if desired.

Obviously certain modifications and variations of the invention as hereinbefore set forth may be made without departing from the spirit and scope thereof, and therefore only such limitations should be imposed as are indicated in the appended claims.

I claim:

1. In a container transfer system wherein a railway car is spaced from a platform surface along at least one side margin thereof for clearance therebetween, said car being of skeleton type basically formed from a longitudinal center sill provided with a plurality of longitudinally spaced transverse container support means at least substantially confined thereto for longitudinal supporting alignment of a plurality of containers thereon, and wherein container transfer cart means are movable along said platform surface and carry containers for transfer between said car and platform surface, the improvement comprising the provision of longitudinally arranged and outwardly projecting support members mounted on opposite sides of said center sill in spaced relation with ends of adjacent transverse support means, a pair of bridging plates selectively aligned with a pair of said transverse support means and extending between said support members of said car and said platform surface to bridge the clearance therebetween, means forming a part of said support members of said car receiving one end portion of each bridging plate in vertically supported relation, the other end portion of each bridging plate being in resting engagement with said platform surface, said one end portion of each bridging plate being provided with means detachably engaging said support members to prevent lateral displacement therefrom, and container transfer cart means at least partially advanced onto said bridging plates from said platform surface into close association with said support members and at least partially straddling the clearance between said car and platform surface over said bridging plates into spaced association with the aligned pair of said transverse support means, said bridging plates being dimensioned and constructed for portable movement longitudinally of said car into selective alignment with successive pairs of said transverse support means.

2. The system of claim 1 wherein said bridging plates are vertically inclined to accommodate vertical spacing between said transverse support means and platform surface.

3. The system of claim 1 wherein said cart means is retractably introduced onto said bridging plates being in engagement with stop means forming a part of said bridging plates.

4. The system of claim 1 wherein said support members of said car are longitudinally continuous along said car and said one end portion of each bridging plate is movable along said support members into alignment with successive transverse support means.

5. The system of claim 1 wherein said transverse support means and cart means include rollers for supporting a container during transfer thereof.

6. The system of claim 1 wherein said transverse support means, bridging plates and cart means include rollers for supporting a container during transfer thereof.

7. In a container transfer system wherein a railway car is spaced from a platform surface along at least one side margin thereof for clearance therebetween, said car being of skeleton type basically formed from a longitudinal center sill provided with a plurality of longitudinally spaced transverse container support means at least substantially confined thereto for longitudinal supporting alignment of a plurality of containers thereon, said car being further provided with outwardly disposed longitudinally continuous safety bars mounted by outrigger members to opposite sides of said center sill in spaced relation with ends of adjacent transverse support means, and wherein wheel supported container transfer cart means are movable along said platform surface and carry containers for transfer between said car and platform surface, the improvement comprising the provision of a pair of bridging plates selectively aligned with a pair of said transverse support means and extending between the safety bar of said one side margin of said car and said platform surface to bridge the clearance therebetween, said last named safety bar receiving one end portion of each bridging plate in vertically supported relation, the other end portion of each bridging plate being in resting engagement with said platform surface, said one end portion of each bridging plate being provided with stop means detachably engaging said last named safety bar to prevent lateral displacement therefrom but permit movement therealong longitudinally of said car, and container transfer cart means having a wheel supported front portion thereof advanced onto said bridging plates from said platform surface into close association with said last named safety bar and straddling the clearance between said car and platform surface over said bridging plates with the rear portion thereof retained in supported engagement with said platform surface, said bridging plates being dimensioned and constructed for portable movement longitudinally of said car into selective alignment with successive pairs of said transverse support means.

8. The system of claim 7 wherein said stop means are in the form of rollers operable along a safety bar for longitudinal movement of said bridging plates into alignment with successive pairs of transverse support means.

References Cited by the Examiner

UNITED STATES PATENTS

| | | | |
|---|---|---|---|
| 887,167 | 5/08 | Wilkes | 105—436 |
| 1,213,081 | 1/17 | Dobbins et al. | |
| 1,563,863 | 12/25 | Joyner. | |
| 1,693,607 | 12/28 | Kellett. | |
| 1,989,920 | 2/35 | Fildes | 105—366 |
| 2,116,150 | 5/38 | Howie et al. | 105—366 |
| 2,666,936 | 1/54 | Palmer | 14—72 |
| 2,775,355 | 12/56 | Leitner et al. | 105—366 |
| 2,950,690 | 8/60 | Bohlen | 105—368 |
| 2,970,550 | 2/61 | Petterson | 105—366 |
| 3,018,496 | 1/62 | Hosbein | 14—71 |

LEO QUACKENBUSH, *Primary Examiner.*